United States Patent [19]

Ny

[11] 4,352,313
[45] Oct. 5, 1982

[54] MUSICAL KEYBOARD FOR HOME COMPUTER

[75] Inventor: Nils O. Ny, Levittown, Pa.

[73] Assignee: RCA Corporation, New York, N.Y.

[21] Appl. No.: 154,836

[22] Filed: May 30, 1980

[51] Int. Cl.³ .............................................. G10C 3/12
[52] U.S. Cl. ...................................... 84/425; 84/462; 84/1.01
[58] Field of Search ................ 84/1.01, 453, 423, 425, 84/461–463; 400/117

[56] References Cited

U.S. PATENT DOCUMENTS 3,111,056 11/1963 Weigl ...................................... 84/425
3,758,697 9/1973 Goldsmith ............................. 84/425
4,104,949 8/1978 Clark ...................................... 84/462

Primary Examiner—David Smith, Jr.
Assistant Examiner—Forester W. Isen
Attorney, Agent, or Firm—Samuel Cohen; Joseph S. Tripoli; Donald W. Phillion

[57] ABSTRACT

A very inexpensive computer input device for music information includes a piano-type keyboard unit adapted to be fastened on to a standard alpha-numeric computer keyboard so that manual "playing" of music on the piano keyboard results in actuation of alpha-numeric keys and the recording of the music in the computer memory, for later playback in audible form, or print-out in sheet music form.

6 Claims, 4 Drawing Figures

MUSICAL KEYBOARD FOR HOME COMPUTER

This invention relates to information input devices for computers, and more particularly to an input device for entering and storing musical information in digital form in the memory of a home computer.

Many commercially-available home computers have the capability of translating stored digital information representing a sequence of musical notes to a corresponding audible sequence of musical notes. There are many input devices by which the digital information representing the music may be stored in the computer memory. The standard alpha-numeric keyboard is an essential part of most home computers, and it may be used by an operator to laboriously describe and enter the sequence of notes of a musical piece into the computer memory. There is a need for a quicker and more direct, and extremely inexpensive, way for the user of a home computer to enter into a computer memory the digital information representing a musical piece which can be reproduced in audible form by the computer, or can be reproduced in the form of a printed score by the computer output devices.

In accordance with an example of the invention, a piano keyboard is provided which is adapted to be mounted over the keys of a standard alpha-numeric keyboard in such a way that manual operation of the piano keys results in the depression of alpha-numeric keys each corresponding with a respective one of the piano keys. A computer responsive to the alpha-numeric keyboard is programmed to recognize the particular musical notes corresponding with the depressed keys.

Figure 1:
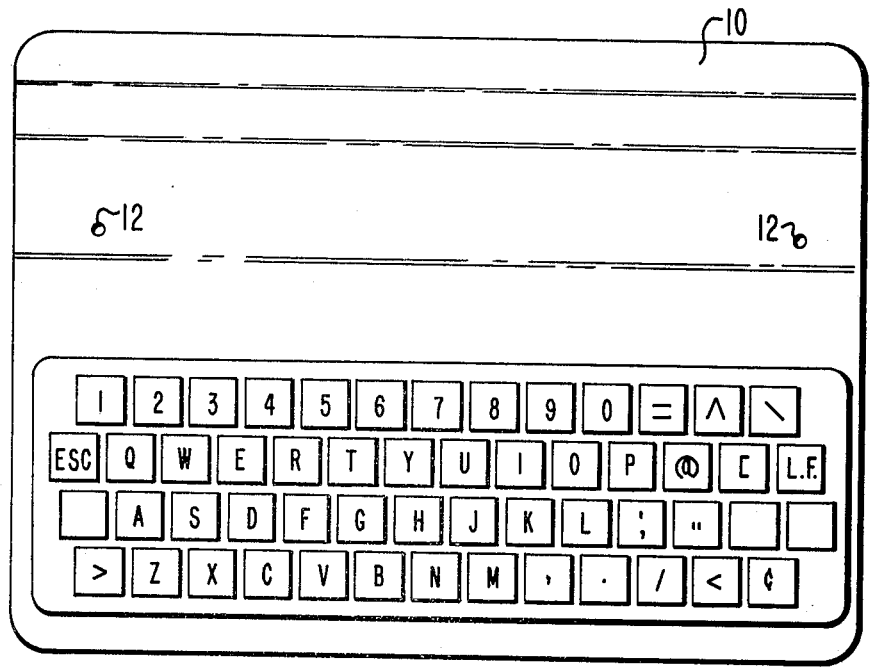
FIG. 1 is a plan or top view of a computer-type alpha-numeric keyboard.

FIG. 1 shows a typical standard alpha-numeric keyboard unit which is used as an input device for a computer. The keys are generally the same in spacing and identification as keys of an electric typewriter. The top row includes numbers 1 through 0 and some symbols. The second, third and fourth rows include the letters of the alphabet and punctuation marks and symbols. Each row may include up to fourteen keys. Keys in one of the rows are utilized, according to the invention, to represent black keys, and keys in another of the rows are utilized to represent the up to fourteen white keys of two octaves of musical notes.

The housing 10 of the keyboard unit in FIG. 1 is provided with two studs 12 by which a piano keyboard may be fastened in operative position over the keys of the alpha-numeric keyboard. Any other suitable type of fasteners, such as snap fasteners, may be employed if desired.

Figure 2:
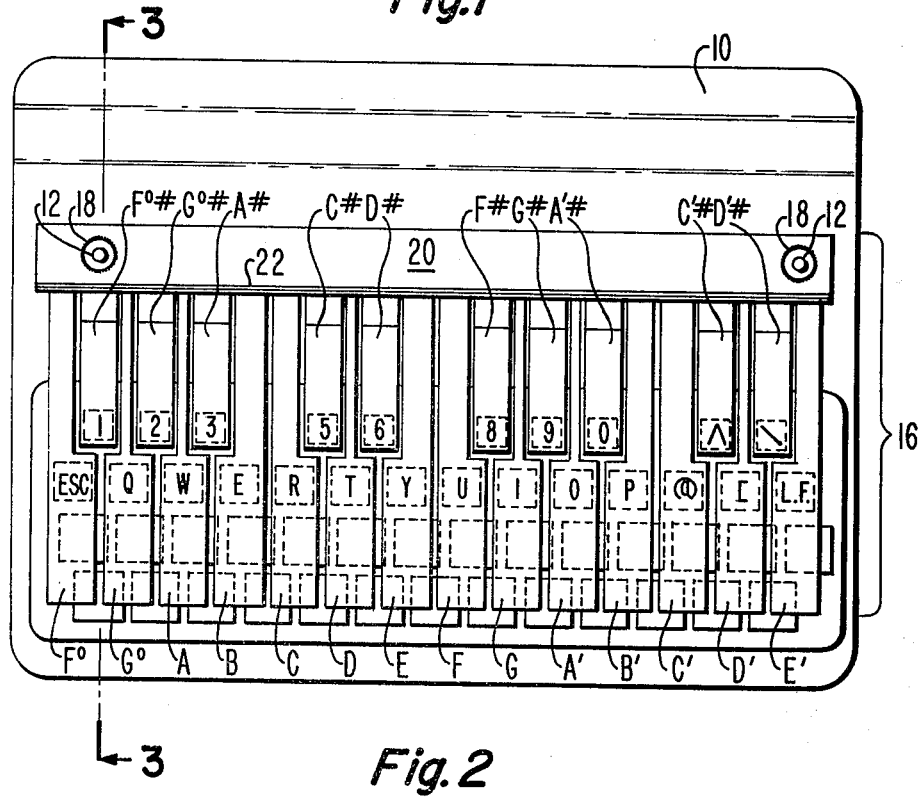
FIG. 2 is a plan or top view of the computer-type alpha-numeric keyboard of FIG. 1 with the piano-type keyboard mounted on top thereof.
Figure 4:
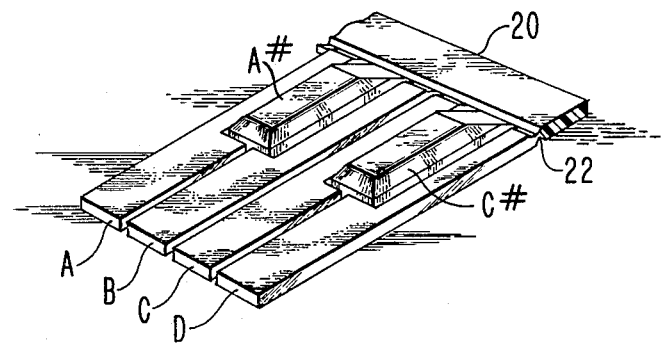
FIG. 4 is a fragmentary perspective view of four of the white keys and two of the black keys of the piano-type keyboard in FIG. 2.

FIG. 2 shows the alpha-numeric keyboard of FIG. 1 with a piano keyboard 16 mounted by means of knurled nuts 18 on the studs 12. The piano keyboard 16 includes a mounting strap 20 having holes to accommodate the studs 12. Ten black piano keys and fourteen white piano keys are hinged to the mounting strap 20 by means of a hinge 22, which may be of conventional construction, or may be merely a line of reduced thickness of the material from which both the keys and the mounting strap is constructed. Known plastics are especially suitable for constructing the keys, hinge and strap from a single piece of material. A fragmentary perspective view of the piano keyboard is shown in FIG. 4.

Figure 3:
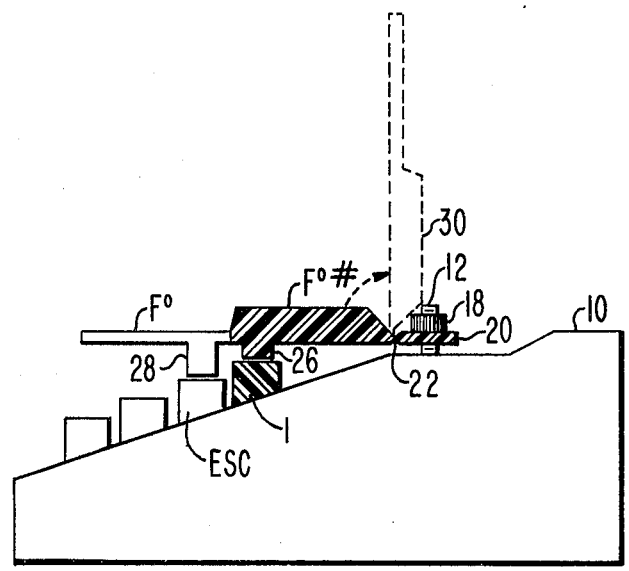
FIG. 3 is a sectional view taken on the line 3—3 of FIG. 2.

As shown in FIGS. 2 and 3, the piano keys are provided with depending protrusions or legs, each adapted to engage a respective one of the keys of the alpha-numeric keyboard. In the example given, the black piano key F°# is provided with a depending leg 26 adapted to engage the top of the alpha-numeric key representing the numeric key "1". The white piano key F° is provided with a dependent leg 28 adapted to engage the alpha-numeric key "ESC" representing "escape". The other black and white keys are constructed and positioned to actuate respective keys in the first and second rows of alpha-numeric keys, according to the following table:

TABLE I

| Piano | | Alpha-Numeric | |
| --- | --- | --- | --- |
| White Key | Black Key | Alphabetic | Numeric |
| F° | F° # | ESC | 1 |
| G° | G° # | Q | 2 |
| A | A# | W | 3 |
| B | | E | |
| C | C# | R | 5 |
| D | D# | T | 6 |
| E | | Y | |
| F | F# | U | 8 |
| G | G# | I | 9 |
| A' | A' # | O | 0 |
| B' | | P | |
| C' | C' # | @ | ∧ |
| D' | D' # | [ | / |
| E' | | LF | |

It will be understood that the foregoing alignment of piano keys with alpha-numeric keys is merely by way of illustration, and that a different two rows of alpha-numeric keys can be used, and other alignments of piano and alpha-numeric keys may be employed. The designations of black keys as sharps or flats depends on the key in which the music is played.

It should be noted that the center-to-center spacing of keys on a standard alpha-numeric keyboard is about three-fourths of an inch, while the spacing of white piano keys is about seven-eighths of an inch. Accordingly, the piano keyboard 16 in FIG. 2 should be constructed with keys having the closer spacing of the keys of the alpha-numeric keyboard shown in FIG. 1. The alpha-numeric keyboard may be constructed without the usual mechanical or electrical interlock, so as to permit the simultaneous operation of more than one key, and thereby permit the simultaneous recording of more than one musical note at a time. While the terms "piano keyboard" and "piano keys" are used extensively throughout the specification and claims, the inventive concept includes "piano-like" keyboards and "piano-like" keys which do not necessarily have the same dimensions as standard piano keyboards and standard piano keys.

In the operation of the invention, the piano keyboard 16 is removably attached to the alpha-numeric keyboard of FIG. 1 by means of studs 12 and thumb nuts 18 as shown in FIG. 2. Some means (not shown) are used to condition the computer to interpret the depression of the alpha-numeric keys as representing the depression of piano keys according to the equivalence set out in Table I. The manual depression of a piano key acts through the protrusions thereunder to depress corresponding the alpha-numeric keys against the force of returning springs in the alpha-numeric keys. When finger pressure is removed from a piano key, the spring in the alpha-numeric key raises the piano key back up to the normal unactuated position. The construction of the piano keyboard 16 is simplified by the fact that it does not need to include springs to return the piano keys to the normal positions.

The piano keys may be raised up out of the way to the position shown by the phantom lines 30 in FIG. 3 when it is desired to operate directly on the alpha-numeric keys. The raising of the piano keys is facilitated by the hinge 22 between the keys and the mounting strap 20. When the piano keys are in the normal operating position, shift keys on the alpha-numeric keyboard are accessible for operation to signal a desired move up or down in octaves, so that the music recorded is not limited to the two octaves covered by the piano keyboard shown in FIG. 2.

What is claimed is:

1. The combination of an alpha-numeric keyboard, a piano-like keyboard including an elongated support and a plurality of side-by-side piano-like keys each hinged at one end to said support; and means for attaching said support to said alpha-numeric keyboard with the piano-like keys extending over respective keys of the alpha-numeric keyboard such that manual depression of each piano-like key causes direct physical contact with, and depression of, a respective alpha-numeric key.

2. The combination as defined in claim 1 wherein said piano-like keys include white keys and black keys, and wherein said white keys are constructed and positioned to actuate one row of keys of said alpha-numeric keyboard, and said black keys are constructed and positioned to actuate another row of keys of said alpha-numeric keyboard.

3. The combination as defined in claim 1 wherein said piano-like keys are hinged to said support in such a way that the piano-like keys can be lifted off from said alpha-numeric keys to permit direct manual use of said alpha-numeric keys.

4. A computer input device, comprising:
an alpha-numeric keyboard, and a piano-like keyboard including an elongated support and a plurality of side-by-side piano-like keys each hinged at one end to said support; and
means for attaching said support to said alpha-numeric keyboard with the piano-like keys extending over respective keys of the alpha-numeric keyboard such that manual depression of each piano-like key causes direct physical contact with, and depression of, a respective alpha-numeric key.

5. A computer input device as defined in claim 4 wherein said piano-like keys include white keys and black keys, and wherein said white keys are constructed and positioned to actuate one row of keys of said alpha-numeric keyboard, and said black keys are constructed and positioned to actuate another row of keys of said alpha-numeric keyboard.

6. A computer input device as defined in claim 4 wherein said piano-like keys are hinged to said support in such a way that the piano-like keys can be lifted off from said alpha-numeric keys to permit direct manual use of said alpha-numeric keys.

* * * * *